US010083098B1

(12) United States Patent
Balmakhtar et al.

(10) Patent No.: US 10,083,098 B1
(45) Date of Patent: Sep. 25, 2018

(54) NETWORK FUNCTION VIRTUALIZATION (NFV) VIRTUAL NETWORK FUNCTION (VNF) CRASH RECOVERY

(71) Applicant: Sprint Communications Company L.P., Overland Park, KS (US)

(72) Inventors: Marouane Balmakhtar, Alexandria, VA (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 121 days.

(21) Appl. No.: 15/175,231

(22) Filed: Jun. 7, 2016

(51) Int. Cl.
*G06F 11/00* (2006.01)
*G06F 11/20* (2006.01)
*G06F 9/455* (2018.01)

(52) U.S. Cl.
CPC ...... *G06F 11/2033* (2013.01); *G06F 9/45558* (2013.01); *G06F 2009/45595* (2013.01); *G06F 2201/815* (2013.01)

(58) Field of Classification Search
CPC ............. G06F 11/2023; G06F 11/2033; G06F 9/45558; G06F 2009/45595; G06F 2201/815
See application file for complete search history.

(56) References Cited

U.S. PATENT DOCUMENTS 9,384,028 B1 * 7/2016 Felstaine ................. H04L 67/02
9,460,286 B1 * 10/2016 Felstaine ............. H04L 63/1458
9,594,649 B2 * 3/2017 Yang ...................... G06F 11/202
9,645,899 B1 * 5/2017 Felstaine ............. G06F 11/2002
2015/0180730 A1 6/2015 Felstaine et al.
2015/0295761 A1 10/2015 Wang et al.
2016/0057208 A1 * 2/2016 Parikh ..................... H04L 67/10
  714/4.11
2016/0103698 A1 * 4/2016 Yang ...................... G06F 11/202
  714/4.11
2016/0170848 A1 * 6/2016 Yang .................. G06F 11/2023
  714/4.12
2016/0212048 A1 * 7/2016 Kaempfer ............. H04L 45/745
2016/0224409 A1 * 8/2016 Liu ...................... H04L 41/0654
2016/0277509 A1 * 9/2016 Qiang ................. H04L 67/1002
2017/0134483 A1 * 5/2017 Miller ................. H04L 67/1031
2017/0164253 A1 * 6/2017 Fujinami ............... H04W 36/08
2017/0185494 A1 * 6/2017 Yang ...................... G06F 11/203
2017/0272523 A1 * 9/2017 Cillis .................... H04L 41/082
2017/0279672 A1 * 9/2017 Krishnan ............ H04L 41/0803

FOREIGN PATENT DOCUMENTS

CN  104170323     11/2014
CN  105471994      4/2016
EP    3119034 A1 *  1/2017  ......... H04L 41/0631
WO  2015042937     4/2015

* cited by examiner

*Primary Examiner* — Joshua P Lottich

(57) ABSTRACT

A Network Function Virtualization (NFV) system recovers from a Virtual Network Function (NFV) crash. Initially, an NFV Infrastructure (NFVI) executes the VNF, and the VNF transfers VNF state data to a VNF database. An NFV orchestrator detects a VNF crash and retrieves the VNF state data for the crashed VNF from the VNF state database. The NFV orchestrator directs the NFVI to install a new VNF to replace the crashed VNF based on the VNF state data. The NFVI installs the new VNF based on the VNF state data.

20 Claims, 6 Drawing Sheets

US 10,083,098 B1

NETWORK FUNCTION VIRTUALIZATION (NFV) VIRTUAL NETWORK FUNCTION (VNF) CRASH RECOVERY

TECHNICAL BACKGROUND

Data communication networks exchange user data for user devices to provide various data communication services. The user devices may be phones, computers, machines, and the like. The data communication services might be media streaming, audio/video conferencing, file transfers, or internet access. Wireless data communication networks use wireless base stations to extend these data communication services to wireless user devices. The data communication networks have started to deploy Network Function Virtualization (NFV) systems to improve service delivery.

NFV systems have an NFV Infrastructure (NFVI) that includes hardware microprocessors, data memories, Input/Output (I/O) transceivers, and virtualization software. NFV systems have Management and Orchestration (MANO) to drive the NFVI to execute Virtual Network Function (VNFs) and deliver the data communication services. For example, some VNFs provide firewall services while other VNFs may provide authorization services.

The VNFs interact with one another in the NFVI. The VNFs also interact with virtual Switches (vSWs) that provide access to NFVI memories, transceivers, and other VNFs. The executing VNFs generate VNF state data like authorization data, connected VNFs and vSWs, and session context. For example, a voice calling VNF may support on-going sessions that each have device addresses, quality-of-service, and other data.

If a VNF crashes in the NFVI, the NFV orchestrator detects the crash and directs the NFVI to install a replacement VNF. The NFVI installs the new VNF, but the state data like interconnected VNFs may be lost or hard to find. Unfortunately, NFV MANO systems do not effectively and efficiently handle VNF crashes in the NFVI.

TECHNICAL OVERVIEW

A Network Function Virtualization (NFV) system recovers from a Virtual Network Function (VNF) crash. Initially, an NFV Infrastructure (NFVI) executes the VNF, and the VNF transfers VNF state data to a VNF database. An NFV orchestrator detects a VNF crash and retrieves the VNF state data for the crashed VNF from the VNF state database. The NFV orchestrator directs the NFVI to install a new VNF to replace the crashed VNF based on the VNF state data. The NFVI installs the new VNF based on the VNF state data.

TECHNICAL DESCRIPTION

Figure 1:
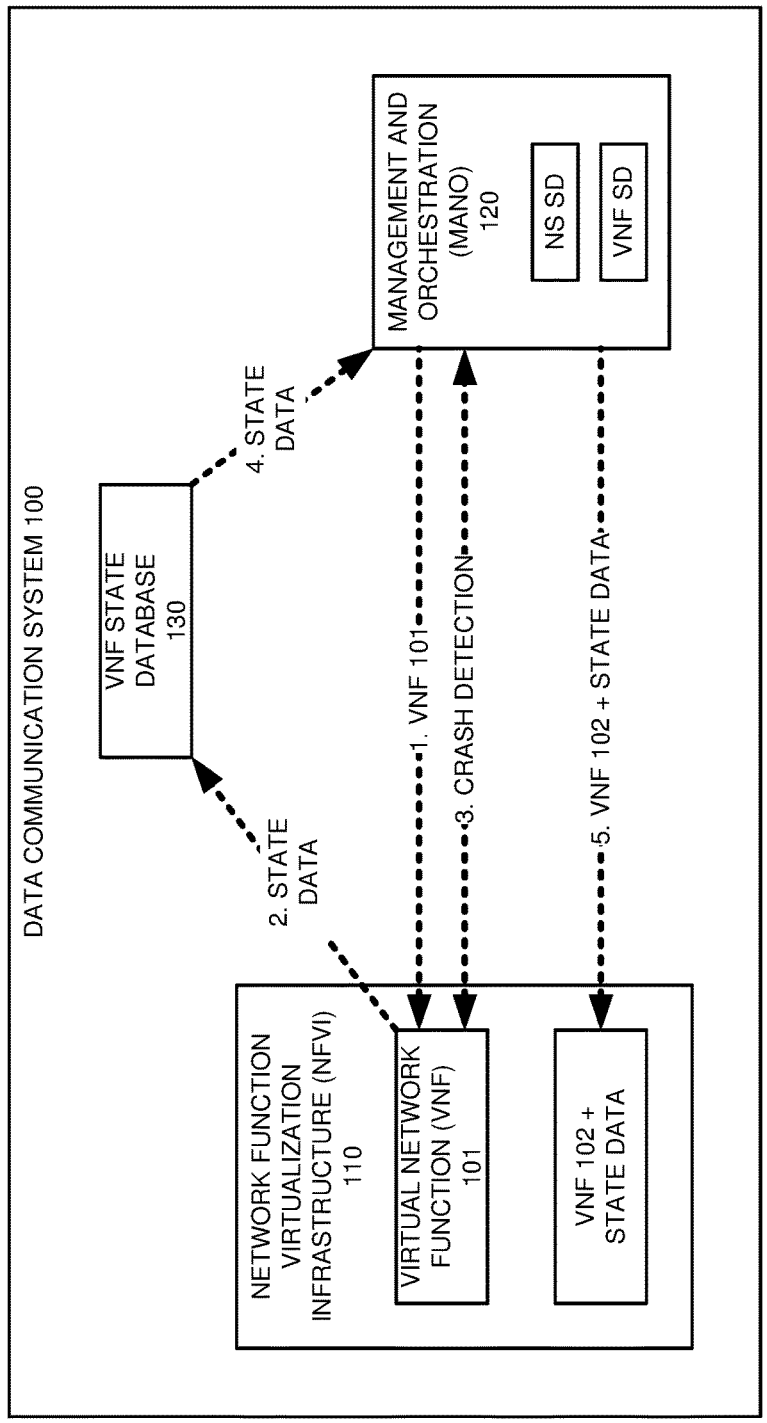
FIG. 1 illustrates a data communication system that recovers from a Virtual Network Function (VNF) crash in a Network Function Virtualization Infrastructure (NFVI).

FIG. 1 illustrates data communication system 100 that recovers from a crash of Virtual Network Function (VNF) 101 in Network Function Virtualization Infrastructure (NFVI) 110. Data communication system 100 exchanges user data for user communication devices like computers, phones, media players, or some other intelligent machines with communication transceivers. The user data exchanges support data communication services like media streaming, media conferencing, user messaging, internet access, or some other information service. Data communication network 100 comprises NFV Infrastructure (NFVI) 110, Management and Orchestration (MANO) 120, and VNF state database 130. NFVI 110, MANO 120, and VNF state database 130 comprise computer systems that have data processing circuitry, memory devices, software, and communication interfaces.

In a first operation, MANO 120 directs NFVI 110 to execute VNF 101. In a second operation, executing VNF 101 transfers VNF state data to VNF state database 130. The VNF Service Descriptor (SD) and/or the Network Service (NS) Service Descriptor (SD) for VNF 101 may have the address or identity of VNF state database 130. VNF state database 130 receives and stores the VNF state data. The VNF state data may indicate communication session context, authorization data, and interconnected VNFs. In some examples, VNF 101 may comprise a priority communication VNF, such as emergency responder VNF. The VNF state data may further comprise priority communication session context like network identifiers, network element identifiers, network addresses, Quality-of-Service (QoS) data, and the like.

In a third operation, MANO 120 detects a crash of VNF 101 in NFVI 110. For example, MANO 120 may fail to receive heartbeat messages from VNF 101 or NFVI 110 may transfer a crash alarm for non-responsive VNF 101. In a fourth operation and in response to the VNF crash, MANO 120 retrieves the VNF state data for crashed VNF 101 from VNF state database 130. The VNF SD and/or the NS SD for VNF 101 may have crash recovery instructions that include the address or identity of VNF state database 130 in addition to other recovery information.

In a fifth operation, MANO 120 directs NFVI 110 to install new VNF 102 to replace crashed VNF 101 based on the VNF state data for VNF 101. NFVI 110 installs and executes new VNF 102 based on the VNF state data, and new VNF 102 now executes in NFVI 110. In addition to the state data, the VNF SD and/or the NS SD for VNF 101 may have additional installation and execution instructions for crashed VNF 101. For example, crashed NFV 101 may have executed in a first hardware portion of the NFVI 110, and MANO 120 may direct NFVI 110 to install replacement VNF 102 in a second hardware portion of the NFV system. The separate hardware portions may comprise separate Central Processing Unit (CPU) cores, CPUs, circuit boards, server blades, servers, or data centers. The separate hardware portions may also comprise separate memories and Input/Output (I/O) interfaces.

In some examples, VNF state database 130 indicates a Hardware Root of Trust (HRoT) relationship between crashed VNF 101 in NFVI 110 and an HRoT control system. HRoT relationships use secret read-only HRoT keys to issue random challenges and transfer hash for hardware identity verification. MANO 120 may process the HRoT state data for crashed VNF 101 to transfer a message indicating the VNF crash to the HRoT control system. In some cases, MANO 120 establishes a new HRoT relationship between new VNF 102 in NFVI 110 (or another NFVI) and the HRoT control system. Thus, the VNF state data may indicate the HRoT control system, HRoT algorithms, HRoT validation schedules, and the like. The VNF SD and/or the NS SD may include similar data.

Figure 2:
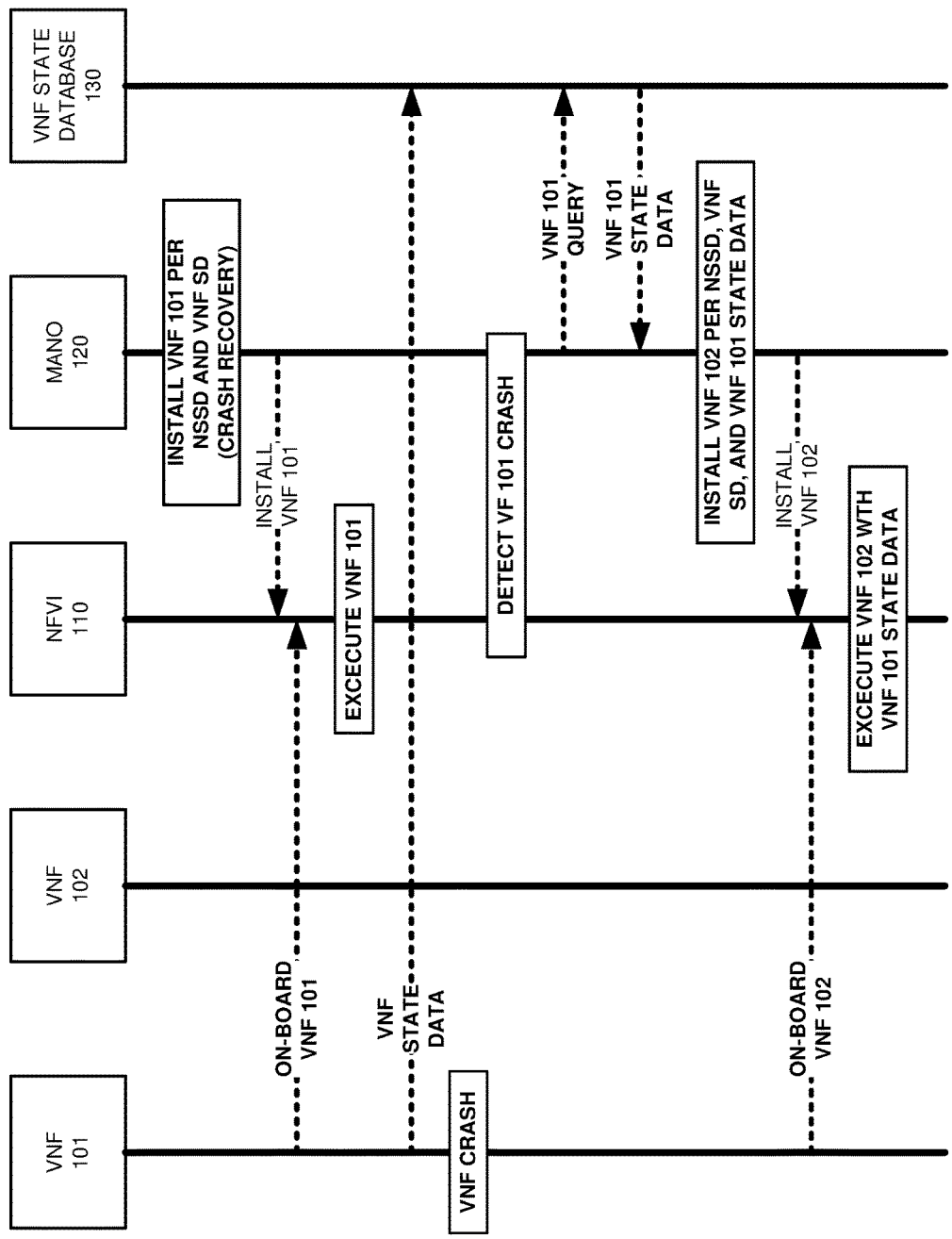
FIG. 2 illustrates the operation of a data communication system to recover from the VNF crash in a NFVI.

FIG. 2 illustrates the operation of data communication system 100 to recover from a crash of VNF 101 in NFVI 110. MANO 120 processes the NS SD and VNF SD to determine that VNF 101 should be installed in NFVI 110 with crash recovery capability. MANO 120 directs NFVI 110 to load and execute VNF 101. NFVI 110 on-boards and runs VNF 101. When executed, VNF 101 transfers VNF state data to VNF state database 130. VNF state database 130 receives and stores the VNF state data. The VNF state data may comprise VNF connections, VNF authentication data, communication session context, or some other VNF data. For example, VNF 101 may comprise a content-delivery VNF. The VNF state data then comprises content-delivery data like content Uniform Resource Locators (URLs), delivery footprint data, and other inter-connected VNFs and vSWs.

VNF 101 crashes. The crash may be caused by various factors, but is detected by a loss of effective communication with VNF 101. For example, a heartbeat message from VNF 101 may stop, or data output from VNF 101 may become spotty or incoherent. NFVI 110 may transfer a crash alarm for non-responsive VNF 101 to MANO 120. In any event, MANO 120 detects the crash of VNF 101 in NFVI 110.

In response to the VNF crash, MANO 120 queries VNF state database 130 for the state data for crashed VNF 101. VNF state database 130 returns the pertinent state data like authorization data and session context. MANO 120 processes the VNF state data, NS SD, and VNF SD to determine that replacement VNF 102 should be installed for crashed VNF 101. MANO directs NFVI 110 to install and execute VNF 102 based on the VNF 101 state data. NFVI 110 on-boards and runs replacement VNF 102. When executed, VNF 102 also transfers VNF state data to VNF state database 130. VNF state database 130 receives and stores the VNF state data.

Figure 3:
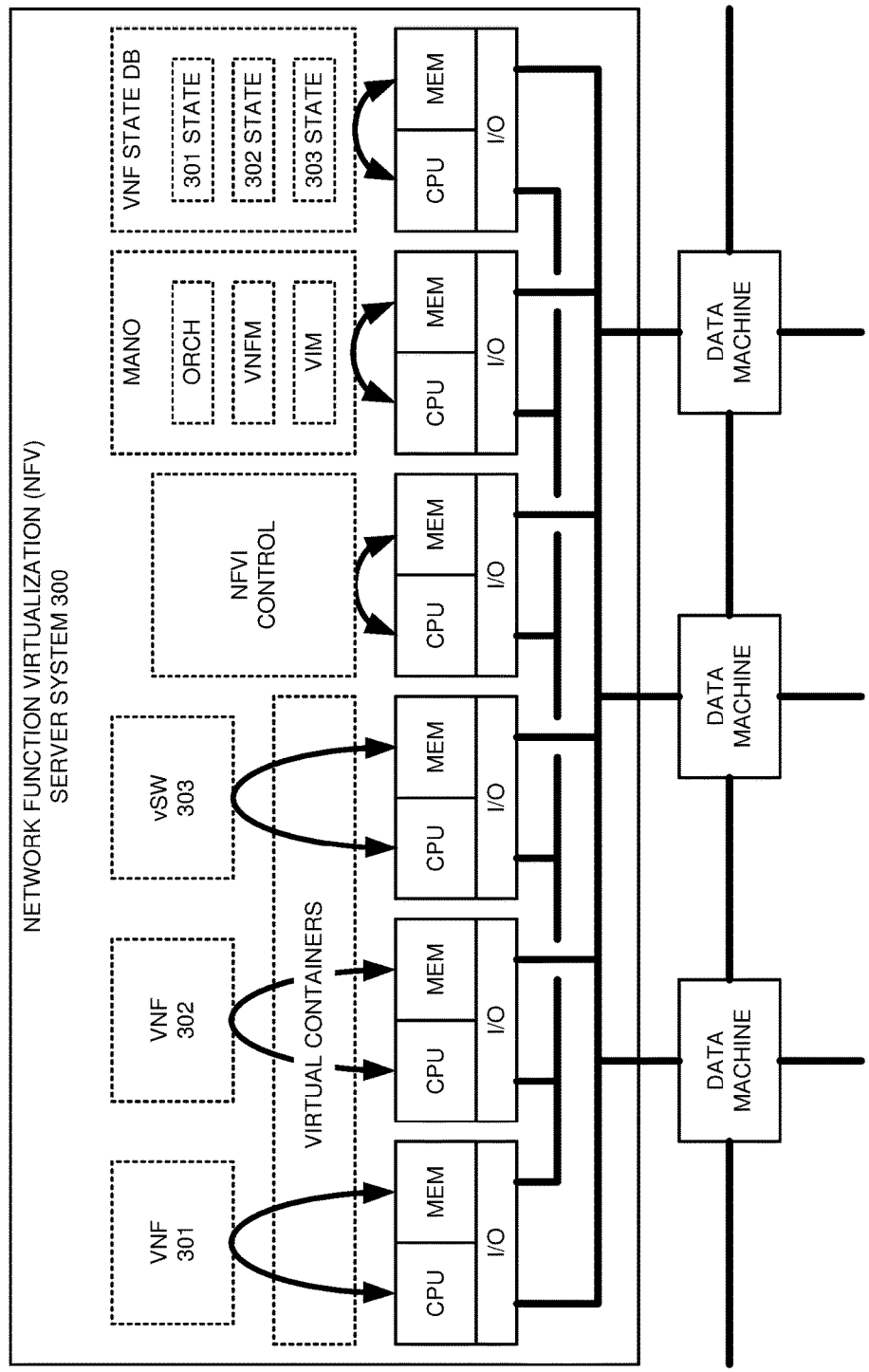
FIG. 3 illustrates an NFV server system that recovers from a VNF crash.

FIG. 3 illustrates Network Function Virtualization (NFV) server system 300 to recover from a crash of VNF 301. NFV server system 300 is an example of data communication system 100, although system 100 may use alternative configurations and operations. NFV server system 300 comprises Central Processing Units (CPUs), data memories (MEM), and Input/Output (I/O) transceivers. The I/O transceivers are coupled to data machines that handle user data for services like media streaming and file exchange. The amount of CPUs, memory, I/O, and software components has been restricted for clarity.

NFV server system 300 includes an NFVI controller, such as a hypervisor and NFVI applications, that direct the CPUs with regard to VNF and vSW execution. Thus, VNFs 301-302 and vSW 303 traverse between the CPUs and memories under the control of the NFVI controller. The MANO system comprises an orchestrator (ORCH), VNF Manager (VNFM), and Virtual Infrastructure Manager (VIM). The VIM directs the NFVI controller to retrieve VNFs 301-302 and vSW 303 from their memories and to execute VNFs 301-302 and vSW 303 on the appropriate CPUs. The VIM also directs the NFVI controller to control which memories and I/O transceivers are used by VNFs 301-302 and vSW 303.

To deliver a data communication service, the orchestrator processes a Network Service (NS) Service Descriptor (SD) and various VNF SDs. The SDs drive the orchestrator to direct the VIM to on-board and execute VNFs 301-302 and vSW 303. The VIM directs the NFVI controller to on-board and execute VNFs 301-302 and vSW 303. When executed by the CPUs, VNFs 301-302 and vSW 303 transfer API calls to the data machines. The data machines process the API calls to support the user data services.

When executing, VNFs 301-302 and vSW 303 transfer state data 301-303 to the VNF state database. The VNF Service Descriptor (SD) and/or the Network Service (NS) Service Descriptor (SD) for VNF 101 may have the address or identity of VNF state database 130. VNF state database 130 receives and stores the VNF state data. The VNF state data comprises VNF authentication data and session context—and also indicates other interconnected VNF 302 and vSW 303. The session context comprises network identifiers, network element identifiers, network addresses, user identifiers, user authentication data, Quality-of-Service (QoS) data, and the like.

The MANO VNFM detects a crash of VNF 302 when the VNFM fails to receive heartbeat messages from VNF 302. The VNFM instructs the orchestrator about the crash, and the orchestrator retrieves the VNF state data for crashed VNF 302 from the VNF state database. The orchestrator also processes the VNF SD and the NS SD for crashed VNF 302 for additional crash recovery instructions. For example, the VNF SD may indicate another type of NFVI for the replacement VNF. The orchestrator directs the VIM to drive the NFVI controller to install a new VNF to replace crashed VNF 302 based on the state data for VNF 302. The NFVI controller installs a new VNF 302 and a CPU executes the new VNF 302 based on the state data for old VNF 302. Thus, new VNF 302 is preconfigured with state data to communicate with VNF 301, vSW 302, and the virtual containers to support existing user data sessions.

The VNF state database may indicate a Hardware Root of Trust (HRoT) relationship between crashed VNF 302 and an HRoT control system. In these cases, the orchestrator pre-configures new VNF 302 with HRoT data to access and get authorized by the HRoT control system. Thus, the VNF state data may indicate the HRoT control system, HRoT algorithms, HRoT validation schedules, and the like.

Figure 4:
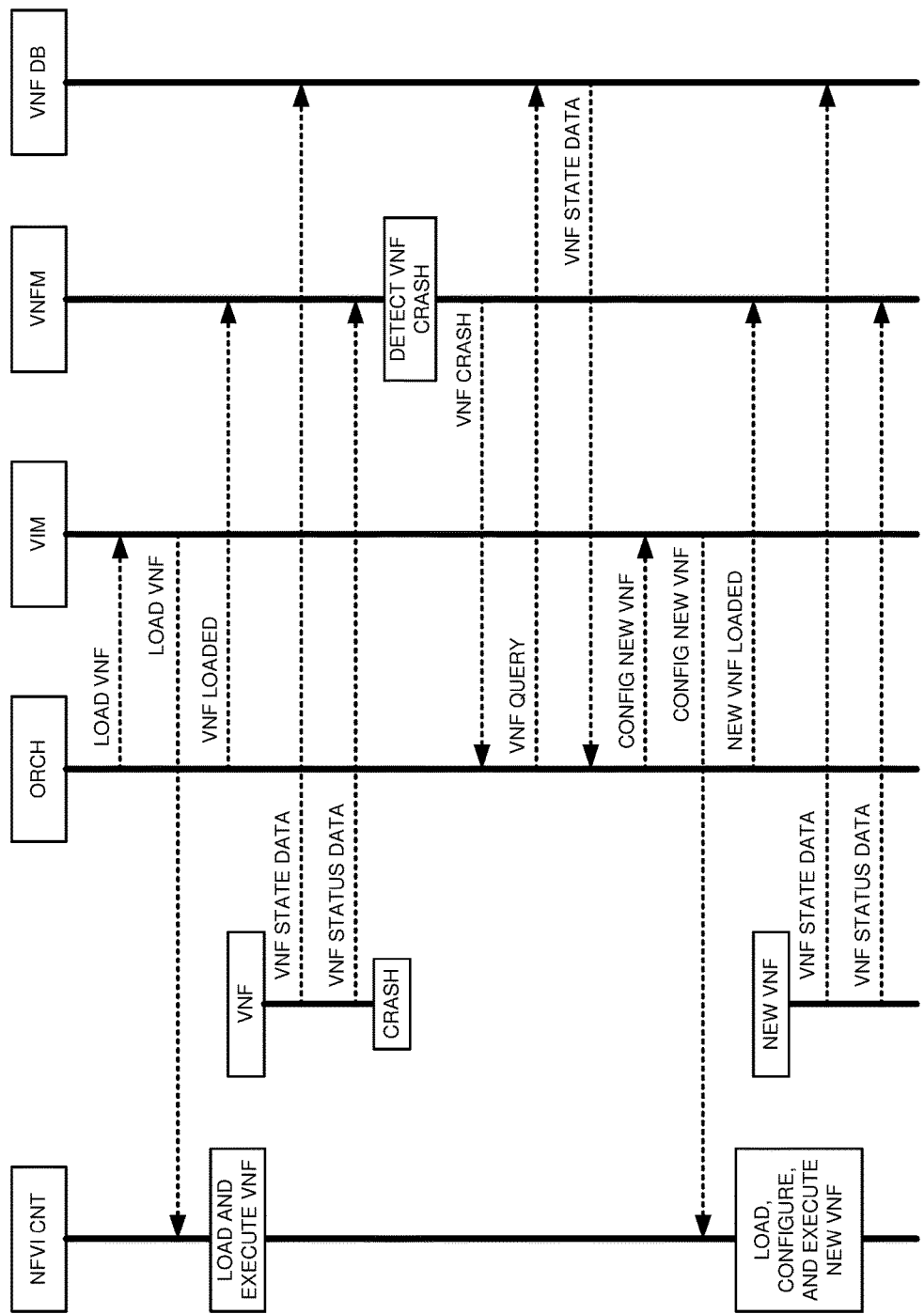
FIG. 4 illustrates he operation of the NFV server system to recover from the VNF crash.

FIG. 4 illustrates the operation of NFV server system 300 to recover from a crash of a VNF. The orchestrator directs the VIM to load and execute a VNF. The VIM directs the NVFI controller to load and execute the VNF. The orchestrator notifies the VNFM of the loaded VNF. The executing VNF transfers VNF state data to the VNF database. The VNF state data comprises authentication data, session context, and other connected VNFs and vSWs. The VNF transfers VNF status data to the VNFM.

When the VNF crashes, the VNFM detects the crash based on a loss of coherent status data from the VNF. The VNFM instructs the orchestrator of the VNF crash, and the orchestrator queries the VNF database for the crashed VNF state data. The VNF database returns the VNF state data to the orchestrator. The orchestrator directs the VIM to drive the NFVI controller to configure and load new VNF with the state data for the crashed VNF. The NFVI controller configures, loads, and executes the new VNF to support existing communication sessions and communicate with other VNFs and vSWs. The new VNF transfers VNF state data to the VNF database. The new VNF transfers VNF status data to the VNFM.

Figure 5:
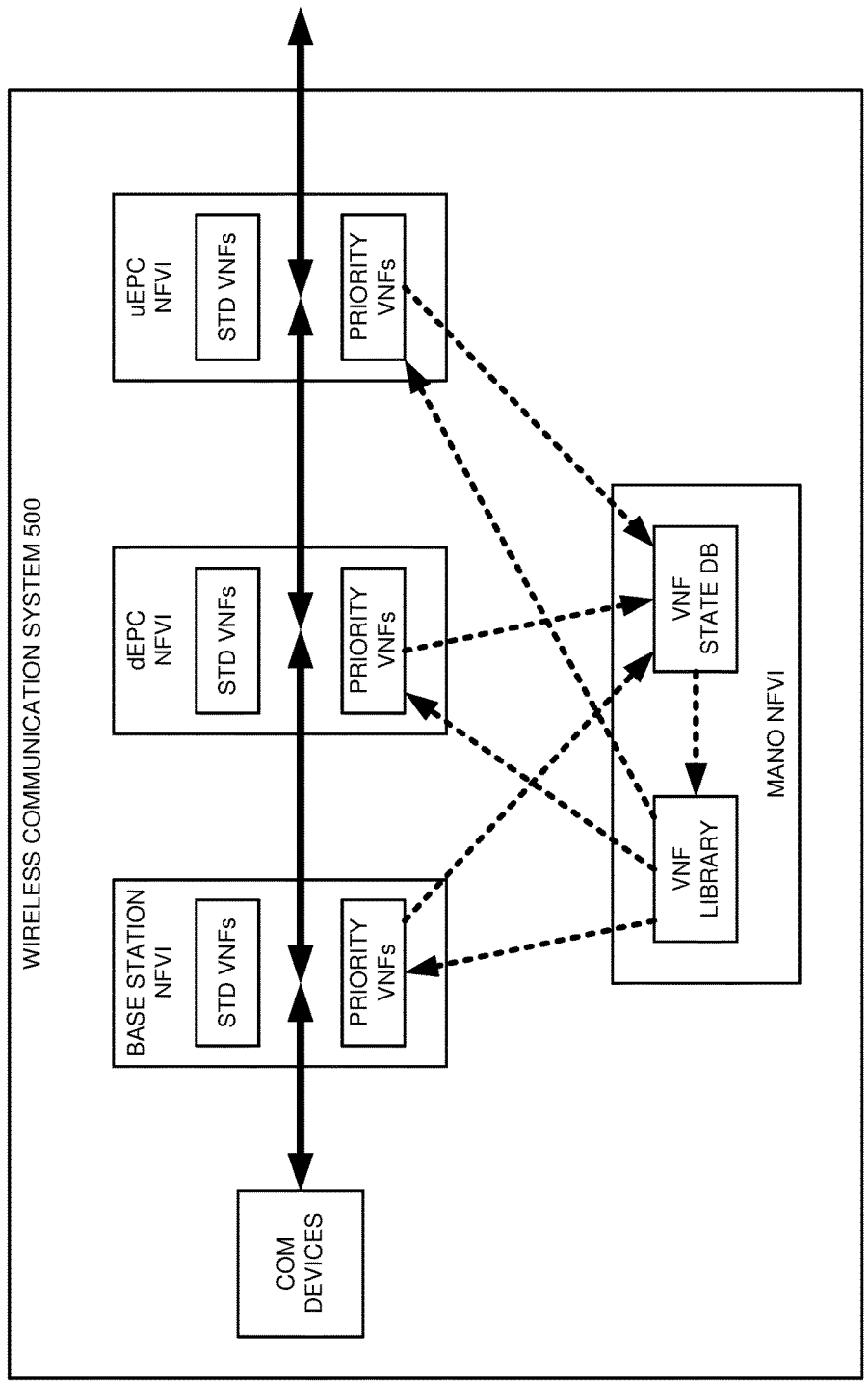
FIG. 5 illustrates a wireless communication system that recovers from a VNF crash.

FIG. 5 illustrates wireless communication system 500 to recover from a crash of a VNF. Wireless communication system 500 is an example of data communication system 100, although system 100 may have other configurations and operations. Wireless communication system 500 comprises various NFVIs. A base station NFVI supports wireless data access for various communication devices. A downstream Evolved Packet Core (dEPC) NFVI supports network access and data services delivered over the base station NFVI. An upstream EPC (uEPC) NFVI supports the data services delivered over the dEPC NFVI and the base station NFVI. The NFVIs execute standard VNFs to deliver standard data services. The NFVIs also execute priority VNFs to deliver priority data services. Exemplary priority data services include emergency conferencing, first-responder communications, high-QoS video, and the like. Both the standard and priority data services are represented by solid lines with double arrows.

The priority VNFs transfer VNF state data to the VNF state database in the MANO NFVI. The VNF state data comprises authentication data, session context, and connected VNFs and vSWs. When a priority VNF crashes, the MANO NFVI detects the VNF crash and transfers the VNF state data for the crashed VNF from the VNF state database to the VNF library in the MANO NFVI. The VNF library configures a new priority VNF with the VNF state data from the crashed VNF and transfers the pre-configured priority VNF to the affected NFVI. The affected NFVI loads the priority VNF which has now been pre-configured to register and authorize, interact with other VNFs and vSWs, and support existing communication sessions. The new priority VNF also transfers VNF state data to the VNF state database.

For example, an emergency message VNF in the base station NFVI may crash. An emergency VNFM in the MANO NFVI detects the crash, and the emergency orchestrator directs the VNF state database to transfer the VNF state data for the crashed VNF to the VNF library. The emergency orchestrator directs the VNF library to configure a replacement VNF with the state data from the crashed VNF. Bases on an SD, the emergency orchestrator directs the VIM to install the replacement VNF in a different portion of the base station NFVI.

Figure 6:
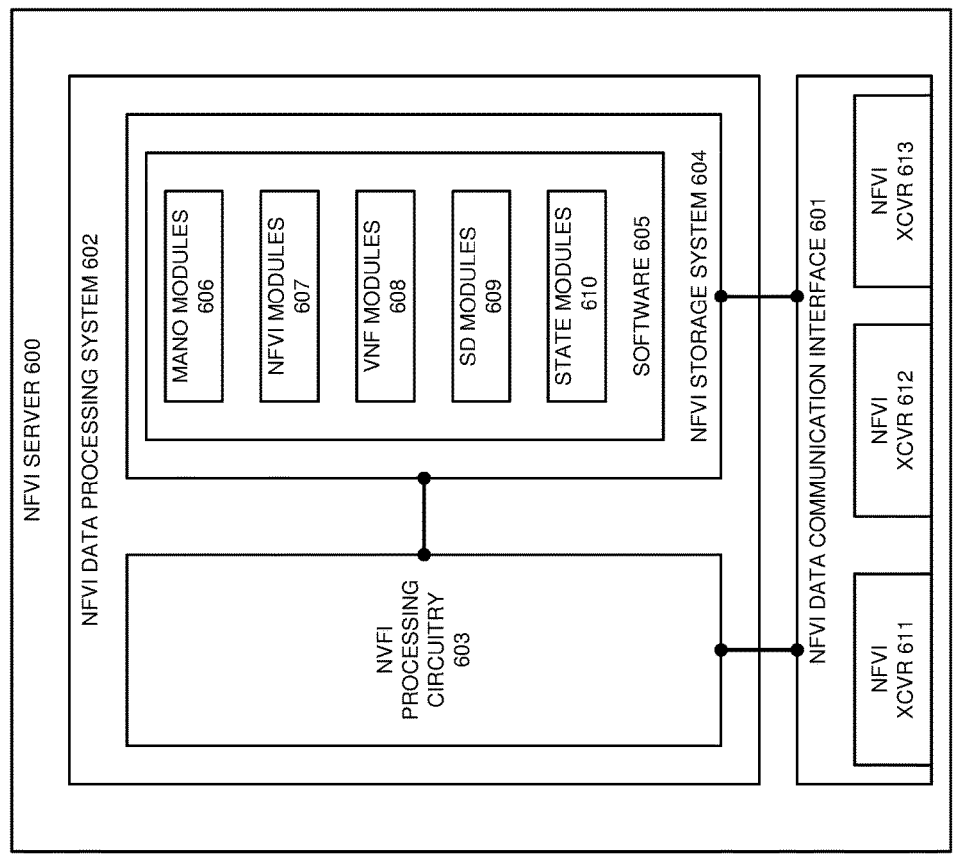
FIG. 6 illustrates an NFVI server that recovers from a VNF crash.

FIG. 6 illustrates NFVI server 600 to recover from a VNF crash. NFVI server 600 comprises NFVI data communication interface 601 and NFVI data processing system 602. Data communication interface 601 comprises NFVI transceivers 611-613. Data processing system 602 comprises NFVI processing circuitry 603 and NFVI storage system 604. Storage system 604 stores NFVI software 605. Software 605 includes respective software modules 606-610.

NFVI transceivers 611-613 comprise communication components, such as ports, bus interfaces, signal processors, memory, software, and the like. Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed. Software 605 includes software modules 606-610 and may also include operating systems, hypervisors, applications, data structures, virtual network elements, utilities, and the like. NFVI server 600 may be centralized or distributed. All or portions of software 606-610 may be externally stored on one or more storage media, such as circuitry, discs, and the like. Some conventional aspects of NFVI server 600 are omitted for clarity, such as power supplies, enclosures, and the like.

When executed by processing circuitry 603, software modules 606-610 direct circuitry 603 to perform the following operations. Management and Orchestration (MANO) modules 606 broker computer services for VNF modules 608 and perform VNF crash recovery operations base on service descriptors and VNF state data. NFVI modules 607 provide a virtual interface to NFVI hardware systems (601, 603, 604) and provide a management interface to MANO modules 606. VNF modules 608 perform networking tasks and transfer VNF state data to state modules 610. Service Descriptor (SD) modules 609 direct MANO modules 606 to install VNF modules 608 to deliver network services. State modules 610 host VNF state data for VNF modules 608 and serve the VNF state data to MANO modules 606 to handle VNF crash recovery.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Network Function Virtualization (NFV) system to recover from a Virtual Network Function (VNF) crash, the method comprising:

first NFV processing circuitry executing a VNF, and in response, the first NFV processing circuitry supporting a wireless data communication service and transferring VNF state data;

VNF memory circuitry receiving and storing the VNF state data;

Management and Orchestration (MANO) processing circuitry executing an NFV orchestrator and the MANO processing circuitry responsively detecting a crash of the VNF by failing to receive heartbeat messages from the crashed VNF and responsively retrieving the VNF state data for the crashed VNF from the VNF memory circuitry;

the MANO processing circuitry executing the NFV orchestrator and the MANO processing circuitry responsively directing second NFV processing circuitry to execute a new VNF to replace the crashed VNF based on the VNF state data;

the second NFV processing circuitry executing the new VNF based on the VNF state data and the second NFV processing circuitry responsively supporting the wireless data communication service and transferring additional VNF state data;

the MANO processing circuitry executing the NFV orchestrator, and in response to the VNF state data, the MANO processing circuitry establishing a new Hardware Root of Trust (HRoT) relationship between the new VNF in second NFV processing circuitry and an HRoT control system; and the second NFV processing circuitry using a secret read-only HRoT key embedded in the second NFV processing circuitry to hash a random challenge from the HRoT control system and the second NFV processing circuitry and responsively transferring a hash result to the HRoT control system for hardware identity verification.

2. The method of claim 1 wherein the MANO processing circuitry directing the NFV system to install the new VNF further comprises directing the NFV system to install the new VNF based on a recovery instruction in a VNF Descriptor for the crashed VNF.

3. The method of claim 1 wherein the MANO processing circuitry directing the NFV system to install the new VNF further comprises directing the NFV system to install the new VNF based on a recovery instruction in a Network Service Descriptor for the crashed VNF.

4. The method of claim 1 wherein the MANO processing circuitry retrieving the VNF state data for the crashed VNF from the VNF state database comprises processing a VNF Descriptor for the crashed VNF to identify the VNF state database.

5. The method of claim 1 wherein the MANO processing circuitry retrieving the VNF state data for the crashed VNF from the VNF state database comprises processing a Network Service Descriptor for the crashed VNF to identify the VNF state database.

6. The method of claim 1 wherein the crashed NFV was executing in a first portion of the NFV system and wherein the MANO processing circuitry directing the NFV system to install the new VNF to replace the crashed VNF comprises directing the NFV system to install the new VNF in a second portion of the NFV system.

7. The method of claim 1 wherein the VNF state database indicates a Hardware Root of Trust (HRoT) relationship between the crashed VNF in the NFV system and an HRoT control system and further comprising the MANO processing circuitry executing the NFV orchestrator and transferring a message indicating the VNF crash for delivery to the HRoT control system.

8. The method of claim 1 wherein the VNF state database indicates a Hardware Root of Trust (HRoT) relationship between the crashed VNF in the NFV system and an HRoT control system and further comprising the MANO processing circuitry executing the NFV orchestrator and establishing a new HRoT relationship between the new VNF in the NFV system and the HRoT control system.

9. The method of claim 1 wherein the VNF comprises a priority communication VNF.

10. The method of claim 1 wherein the VNF state data comprises a priority communication session context.

11. A Network Function Virtualization (NFV) system to recover from a Virtual Network Function (VNF) crash, the NFV system comprising:
first NFV processing circuitry configured to execute a VNF to support a wireless data communication service and to transfer VNF state data;
VNF memory circuitry configured to receive and store the VNF state data;
Management and Orchestration (MANO) processing circuitry configured to execute an NFV orchestrator to detect a crash of the VNF by failing to receive heartbeat messages from the crashed VNF and responsively retrieve the VNF state data for the crashed VNF from the VNF memory circuitry and direct second NFV processing circuitry to execute a new VNF to replace the crashed VNF based on the VNF state data;
the second NFV processing circuitry configured to execute the new VNF based on the VNF state data to support the wireless data communication service and to transfer additional VNF state data;
the MANO processing circuitry configured to execute the NFV orchestrator, and in response to the VNF state data for the crashed VNF, the MANO processing circuitry configured to establish a new Hardware Root of Trust (HRoT) relationship between the new VNF in second NFV processing circuitry and an HRoT control system; and
the second NFV processing circuitry configured to use a secret read-only HRoT key embedded in the second NFV processing circuitry to hash a random challenge from the HRoT control system to transfer a hash result to the HRoT control system for hardware identity verification.

12. The NFV system of claim 11 wherein the MANO processing circuitry is configured to direct the NFVI to install the new VNF based on a recovery instruction in a VNF Descriptor for the crashed VNF.

13. The NFV system of claim 11 wherein the MANO processing circuitry is configured to direct the NFVI to install the new VNF based on a recovery instruction in a Network Service Descriptor for the crashed VNF.

14. The NFV system of claim 11 wherein the MANO processing circuitry is configured to process a VNF Descriptor for the crashed VNF to identify the VNF state database.

15. The NFV system of claim 11 wherein the MANO processing circuitry is configured to process a Network Service Descriptor for the crashed VNF to identify the VNF state database.

16. The NFV system of claim 11 wherein the crashed NFV was executing in a first portion of the NFVI and wherein the MANO processing circuitry is configured to direct the NFVI to install the new VNF in a second portion of the NFVI.

17. The NFV system of claim 11 wherein the VNF state database indicates a Hardware Root of Trust (HRoT) relationship between the crashed VNF in the NFV system and an HRoT control system and further comprising the MANO processing circuitry configured to execute the NFV orchestrator and transfer a message indicating the VNF crash for delivery to the HRoT control system.

18. The NFV system of claim 11 wherein the VNF state database indicates a Hardware Root of Trust (HRoT) relationship between the crashed VNF in the NFV system and an HRoT control system and further comprising the MANO processing circuitry configured to execute the NFV orchestrator and establish a new HRoT relationship between the new VNF in the NFV system and the HRoT control system.

19. The NFV system of claim 11 wherein the VNF comprises a priority communication VNF.

20. The NFV system of claim 11 wherein the VNF state data comprises a priority communication session context.

* * * * *